INVENTOR.
WILLIAM F. MACGLASHAN, JR.

ATTORNEY

3,302,662
ANTIFLUTTER BALL CHECK VALVE
James E. Webb, Administrator of the National Aeronautics and Space Administration with respect to an invention of William F. MacGlashan, Jr., 1141 S. Pasadena Ave., Pasadena, Calif. 91105
Filed May 21, 1964, Ser. No. 369,337
2 Claims. (Cl. 137—539)

This invention relates to antiflutter ball check valves, and included in the objects of this invention are:

First, to provide an antiflutter ball check valve which is particularly adapted for use under conditions wherein the pressure differential across the valve is high causing high velocity flow.

Second, to provide an antiflutter ball check valve which utilizes a novelly arranged spring continuously engageable with the ball valve element in such a manner as to restrain the ball member against flutter.

Third, to provide an antiflutter check valve which incorporates a novelly arranged baffle directing the flow of fluid through the valve in such a manner as to avoid fluid impact against the retainer spring.

With the above and other objects in view, as may appear hereinafter, reference is directed to the accompanying drawings in which.

Figure 1:
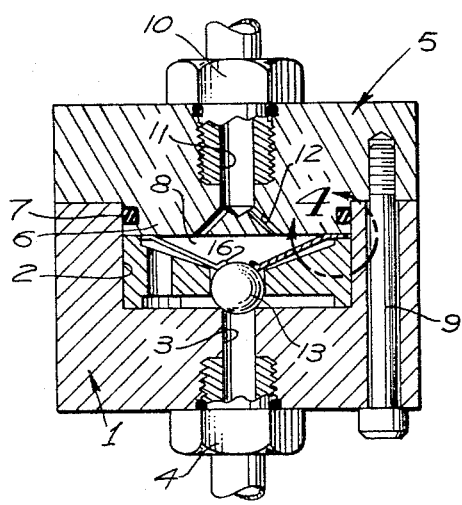
FIG. 1 is a longitudinal sectional view of the antiflutter ball check valve taken through 1—1 of FIG. 2, showing the ball valve in its closed position.
Figure 2:
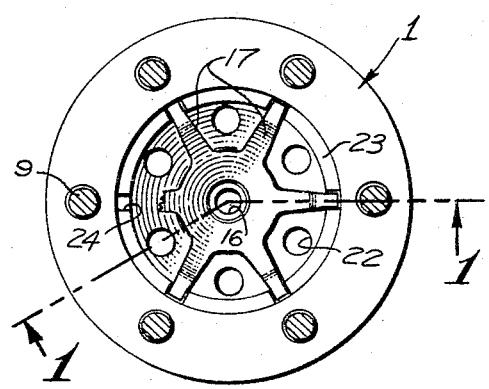
FIG. 2 is a top view thereof with the cap removed.
Figure 3:
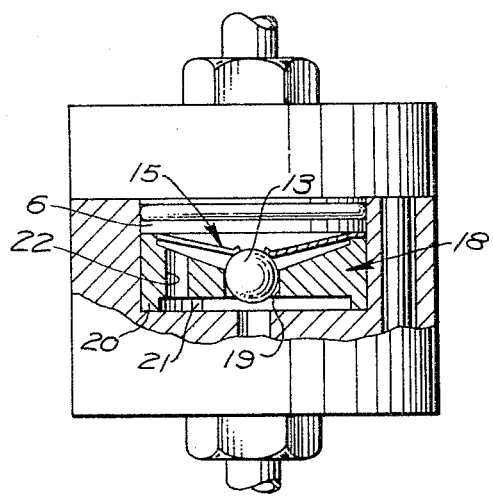
FIG. 3 is a partial sectional, partial elevational view showing the valve in its open position.
Figure 4:
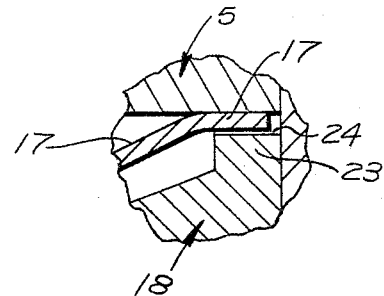
FIG. 4 is an enlarged, fragmentary sectional view taken within circle 4 of FIG. 1.

The antiflutter ball check valve includes a body 1 which may be cylindrical in form and provided with a cylindrical recess 2. The recess is intersected by a centrally located inlet port 3 communicating with an inlet fitting 4 secured in the end of the valve body 1.

The recessed end of the valve body 1 receives a cap 5 having a cylindrical boss 6 equipped with a seal ring 7. The boss 6 forms with the recess 2 a valve chamber 8. Bolts 9 extend through the valve body 1 and into the cap 5. The cap is provided with an outlet fitting 10, and continuing from the outlet fitting 10 is an outlet socket 11 which communicates with the valve chamber 8 through several downwardly diverging outlet ports 12.

The inner end of the inlet port 3 forms a valve seat which is closed by a ball valve 13. The ball valve 13 is held in place by a novelly arranged retainer spring 15 in the form of a disk, having a central aperture 16 somewhat smaller in diameter than the ball valve 13 so that the ball valve extends partially therein. The periphery of the retainer spring 15 is provided with radiating fingers 17 which bear against the periphery of the boss 6.

Surrounding the ball valve 13 and disposed under the spring 15 is a baffle disk 18 having a central aperture 19 which loosely receives the ball valve 13. The underside is provided with a peripheral rim 20 so as to form a recess 21.

The recess 21 is intersected by a ring of ports 22 which are located midway between the fingers 17. The upper side of the baffle disk 18 is conical to clear the retainer spring 15, and is provided with a peripheral rim 23 having notches 24 which slidably receive and guide the fingers 17 so as to maintain the fingers 17 equally spaced between the ring of ports 22.

In the operation of the antiflutter ball check valve, fluid flows laterally into the recess 21 and upwardly through the ring of ports 22, then outward through the ports 12. In doing so the fluid does not exert force on the radiating fingers 17 or disturb the retainer spring 15. This permits the spring 15 to maintain a uniform, undisturbed load on the ball valve 13 so as to prevent fluttering of the ball valve. The aperture 19 guides and centers the ball valve 13 in both its open and closed positions.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. An antiflutter ball check valve, comprising:
   (a) a body structure defining an inlet, an outlet, and a value chamber therebetween;
   (b) a ball valve engageable with said inlet;
   (c) a baffle disk having a central guide bore for said ball valve, and a ring of ports surrounding and spaced from said guide bore;
   (d) and a retainer spring in the form of a disk interposed between said baffle plate and the outlet end of said chamber, said spring having a central portion overlying said guide bore and engaging said ball valve, and radiating spring fingers.

2. An antiflutter ball check valve, comprising:
   (a) a body structure defining an inlet, an outlet, and a valve chamber therebetween;
   (b) a ball valve engageable with said inlet;
   (c) a baffle disk having a central aperture forming a guide for said ball valve, and a ring of axially directed flow ports, the side of said disk confronting said inlet being recessed to form a radiating flow passage for communication with said ring of flow ports, and the opposite side of said disk forming a conical depression;
   (d) and a retainer spring in the form of a disk extending into said conical recess for engagement with said ball valve, and radiating spring fingers disposed between said flow ports out of the paths of flow therefrom and bearing against the outlet side of said valve chamber to urge said ball valve towards it seat.

References Cited by the Examiner
UNITED STATES PATENTS

| | | | |
|---|---|---|---|
| 2,492,740 | 12/1949 | Garratt | 137—535 X |
| 2,699,179 | 1/1955 | Hansen et al. | 137—539 |
| 3,086,746 | 4/1963 | Holleron | 137—539 X |

FOREIGN PATENTS

| | | |
|---|---|---|
| 463,551 | 7/1928 | Germany. |

WILLIAM F. O'DEA, *Primary Examiner.*

D. H. LAMBERT, *Assistant Examiner*